United States Patent
Frankstein

(10) Patent No.: US 9,106,172 B2
(45) Date of Patent: Aug. 11, 2015

(54) ELECTRIC MACHINE TEMPERATURE CONTROL

(71) Applicant: HORIBA International Corporation, Irvine, CA (US)

(72) Inventor: Dmitry Frankstein, Troy, MI (US)

(73) Assignee: HORIBA Instruments Incorporated, Irvine, CA (US)

( * ) Notice: Subject to any disclaimer, the term of this patent is extended or adjusted under 35 U.S.C. 154(b) by 76 days.

(21) Appl. No.: 13/930,932

(22) Filed: Jun. 28, 2013

(65) Prior Publication Data

US 2015/0002054 A1   Jan. 1, 2015

(51) Int. Cl.
*H02P 7/18* (2006.01)
*H02P 29/00* (2006.01)

(52) U.S. Cl.
CPC .................. *H02P 29/0061* (2013.01)

(58) Field of Classification Search
CPC .................. H02P 6/001; H02P 6/06
USPC ........... 318/162, 400.01, 400.04, 400.08, 700
See application file for complete search history.

(56) References Cited

U.S. PATENT DOCUMENTS

| | | | | |
|---|---|---|---|---|
| 4,357,565 A | * | 11/1982 | Saito et al. | 318/473 |
| 4,626,753 A | | 12/1986 | Letterman | |
| 5,257,863 A | * | 11/1993 | Chu et al. | 374/153 |
| 6,834,244 B2 | | 12/2004 | Kim | |
| 6,970,093 B1 | * | 11/2005 | Hornberger et al. | 340/648 |
| 7,551,411 B2 | * | 6/2009 | Woods et al. | 361/33 |
| 8,106,618 B2 | | 1/2012 | Fabis et al. | |
| 8,358,095 B2 | | 1/2013 | Savagian et al. | |
| 2008/0272731 A1 | | 11/2008 | Schulz et al. | |
| 2012/0217916 A1 | | 8/2012 | Wu et al. | |

FOREIGN PATENT DOCUMENTS

| | | |
|---|---|---|
| EP | 0748038 B1 | 8/2002 |
| JP | 3567770 B2 | 9/2004 |
| WO | 2006015380 A2 | 2/2006 |

OTHER PUBLICATIONS

Jeff Wilson, Industrial Motor Control Part 2, Freescale Technology Forum, Jul. 2009, 26 pgs.
Bumpless Control Transfer Between Manual and PID Control, MathWorks, printed on Sep. 9, 2013, 5 pgs., http://www.mathworks.com/help/simulink/examples/bumpless-control-transfer-between-manual-and-pid-control.html.

* cited by examiner

*Primary Examiner* — David S Luo
(74) *Attorney, Agent, or Firm* — Brooks Kushman P.C.

(57) ABSTRACT

A test automation system may specify a temperature setpoint for an electric machine system and generate a command for the electric machine system to output a torque in such a manner that a temperature of the electric machine system varies within a predefined range of the temperature setpoint for at least a predefined period of time.

15 Claims, 5 Drawing Sheets

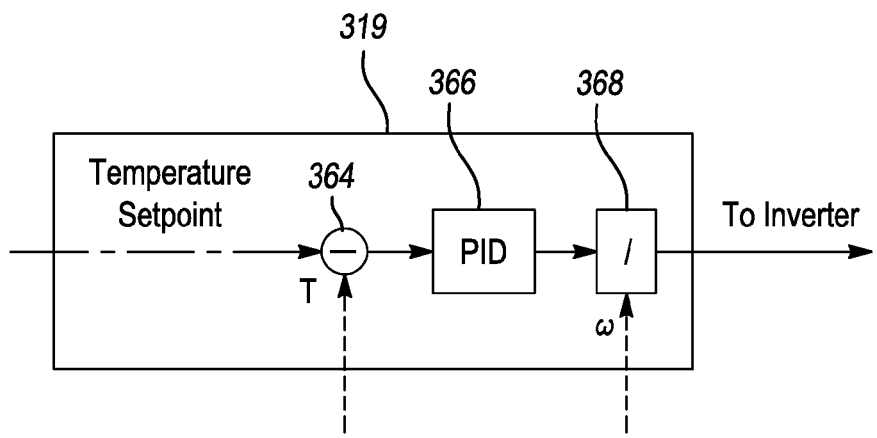

Fig-4

| Time | Mode | Temperature Setpoint | Torque Setpoint | Speed Setpoint |
|------|------|----------------------|-----------------|----------------|
| t0 | Temperature Control (Fig. 4) | 80 C | — | 1000 rpm |
| t1 | Torque Control (Fig. 1) | — | 100 Nm | 1000 rpm |
| t2 | Temperature Control (Fig. 4) | 80 C | — | 1000 rpm |
| t3 | Torque Control (Fig. 1) | — | 110 Nm | 1000 rpm |
| t4 | Temperature Control (Fig. 4) | 80 C | — | 1000 rpm |
| ... | ... | ... | ... | ... |
| t40 | Temperature Control (Fig. 4) | 80 C | — | 1100 rpm |
| t41 | Torque Control (Fig. 1) | — | 100 Nm | 1100 rpm |
| t42 | Temperature Control (Fig. 4) | 80 C | — | 1100 rpm |
| t43 | Torque Control (Fig. 1) | — | 110 Nm | 1100 rpm |
| t44 | Temperature Control (Fig. 4) | 80 C | — | 1100 rpm |
| ... | ... | ... | ... | ... |
| t100 | Temperature Control (Fig. 4) | 120 C | — | 1000 rpm |
| t101 | Torque Control (Fig. 1) | — | 100 Nm | 1000 rpm |
| t102 | Temperature Control (Fig. 4) | 120 C | — | 1000 rpm |
| t103 | Torque Control (Fig. 1) | — | 110 Nm | 1000 rpm |
| t104 | Temperature Control (Fig. 4) | 120 C | — | 1000 rpm |
| ... | ... | ... | ... | ... |

Fig-5

ELECTRIC MACHINE TEMPERATURE CONTROL

TECHNICAL FIELD

This disclosure relates to the control of electric machines.

BACKGROUND

Laboratory tests play a significant role in electric motor development—automotive electric motor development in particular because automotive environments present a wide variety of loading and ambient conditions. Therefore, laboratory tests should validate electric motor design and extended operation for such environments in a relatively brief amount of time and in a reliable and repeatable manner.

SUMMARY

A test automation system includes at least one controller that receives a temperature setpoint for an electric machine system and generates a command for the electric machine system to output a torque such that a temperature of the electric machine system varies within a predefined range of the temperature setpoint for at least a predefined period of time.

A method for controlling an electric machine system includes receiving a temperature setpoint for the electric machine system, and commanding the electric machine system to output a torque such that the electric machine system achieves the temperature setpoint based on a temperature of the electric machine system.

A test automation system includes at least one controller that receives a temperature setpoint for an electric machine and controls the electric machine based on a difference between the temperature setpoint and a temperature of the electric machine to stabilize the electric machine at the temperature setpoint.

BRIEF DESCRIPTION OF THE DRAWINGS

FIGS. 1, 2, 3 and 4 are block diagrams of motor control systems.

FIG. 5 is a table of setpoints associated with a motor calibration and performance test procedure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Typically, an electric motor operating set point is controlled to achieve maximum efficiency (maximum torque output for minimum energy consumed). Because temperature can affect a number of electric motor operating parameters, an electric motor can be placed, for example, within a thermal chamber for testing purposes and commanded to operate at its normal set point. (Operating an electric motor at elevated temperatures can accelerate its wear.)

The inventors have recognized that, for testing purposes (e.g., durability testing, calibration testing, efficiency testing, etc.), an electric motor operating set point can be controlled to achieve a desired electric motor temperature in a stable and repeatable manner (to vary within a predefined range, such as ±3 or ±5° Celsius (C), of the desired temperature for a predefined period of time, such as 2 or 4 minutes). In certain examples, a proportional-integral-derivative (PID) controller, fuzzy logic controller, etc. can be used to achieve a temperature set point and/or a torque set point. That is, a desired temperature in addition to a desired torque can be used for electric machine control. Put a different way, the current vector can be skewed by an offset to reduce electric motor efficiency and achieve a target temperature. Rotor or stator temperature, in other examples, can be controlled by varying the electric load on the electric motor.

Motor Control Schemes

Figure 1:
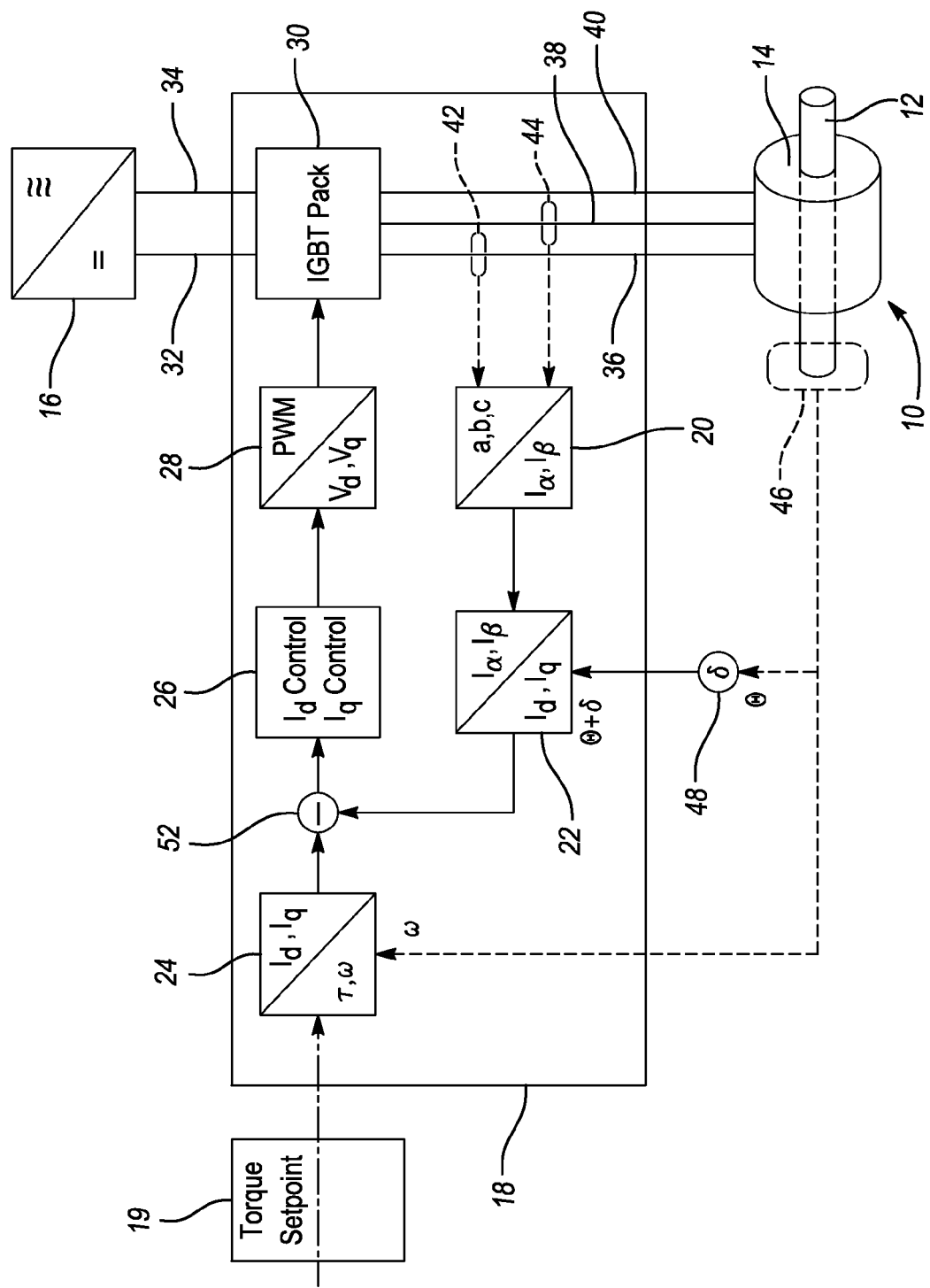

Referring to FIG. 1, an electric machine 10 includes a rotor 12 and stator 14 (with at least one winding). The electric machine 10 is arranged to receive power from a DC bus 16 via an inverter 18. That is, the inverter 18 receives DC current from the DC bus 16 and provides three-phase AC current to the electric machine 10. An inverter controller 19 provides a torque setpoint to the inverter 18 for the electric machine 10 for control purposes. As explained in more detail below, this torque setpoint will influence the operation of the inverter 18 so that electrical parameters associated with the three-phase AC current cause the electric machine 10 to output a torque approximately equal to the torque setpoint.

The inverter 18 includes a Clarke transform 20, a Park transform 22, a lookup table 24, Id and Iq controllers 26, an inverse Park/3rd harmonic/space vector modulation controller 28, and an insulated-gate bipolar transistor (IGBT) pack 30. The DC current from the DC bus 16 is supplied to the IGBT pack 30 via electrical lines 32, 34. The IGBT pack 30 transforms the DC current into three-phase AC current according to the operation of its switches, which are governed by pulse width modulation commands to be discussed in greater detail below. The three-phase AC current from the IGBT pack 30 is supplied to the electric machine 10 via the electrical lines 36, 38, 40. Current sensors 42, 44 are arranged to sense current associated with the electrical lines 36, 38 respectively.

The Clarke transform 20 performs a space vector transformation of the time domain signals sensed by the current sensors 42, 44 from a natural three-phase coordinate system (a, b, c) into a stationary two-phase reference frame (α, β, 0). The Park transform 22 performs a transformation of the time domain signals from the stationary two-phase reference frame (α, β, 0) into a rotating coordinate system (d, q, 0) based on a corrected position of the rotor 12.

The Park transform 22 takes into account a position of the rotor 12 as mentioned above. As such, an absolute position sensor 46 (e.g., a resolver) is arranged to detect an angle (θ) and speed (ω) associated with the rotor 12. The accuracy with which the resolver 46 is aligned relative to the magnetic field of the rotor 12 can affect accuracy of control of the electric machine 10. Because the resolver 46 in practice is subject to manufacturing tolerances, a resolver offset operation 48 (δ) is applied to raw position data detected by the resolver 46 to correct for misalignment during assembly. This corrected angle data (θ+δ) is provided to the Park transform 22.

The lookup table 24 (or the like) transforms the torque setpoint discussed above and the speed data from the resolver 46 into current time domain signals (Id, Iq) in the rotating coordinate system (d, q, 0). The signals from the Park transform 22 and the lookup table 24 are compared at difference block 52. The Id and Iq controllers 26 correct the Id and Iq commands to reduce any error resulting from the difference block 52. The inverse Park/3rd harmonic/space vector modulation controller 28 performs vector transformation of the Id and Iq error signals from the rotating coordinate system (d, q, 0) into the stationary two-phase reference frame (α, β, 0), and generates commands for the IGBT pack 30 necessary to reduce error amplitude to zero. The pulse width modulation commands from the inverse Park/3rd harmonic/space vector modulation controller 28 control the switches of the IGBT pack 30 to achieve the desired torque output.

Figure 2:
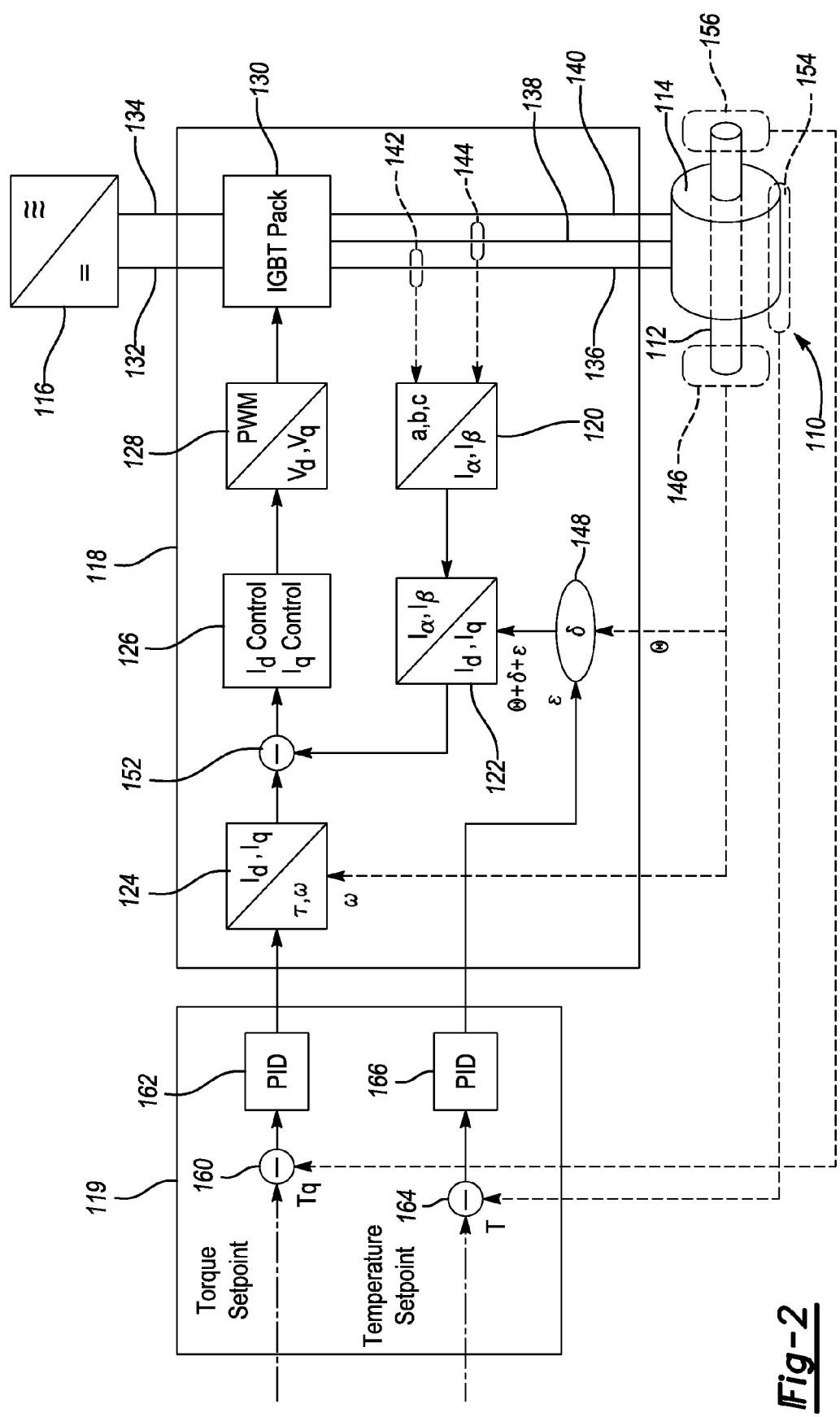

Referring to FIG. 2, elements that share similar numbering to that of FIG. 1 have similar descriptions. An electric machine 110 includes a rotor 112 and stator 114 (with at least one winding). The electric machine 110 is arranged to receive power from a DC bus 116 via an inverter 118. The inverter 118 includes a Clarke transform 120, a Park transform 122, a lookup table 124, Id and Iq controllers 126, an inverse Park/3rd harmonic/space vector modulation controller 128, and an insulated-gate bipolar transistor (IGBT) pack 130. (Other inverter arrangements are, of course, also possible.)

DC current from the DC bus 116 is supplied to the IGBT pack 130 via electrical lines 132, 134. Three-phase AC current from the IGBT pack 130 is supplied to the electric machine 110 via the electrical lines 136, 138, 140. Current sensors 142, 144 are arranged to sense current associated with the electric lines 136, 138 respectively.

An absolute position sensor 146 (e.g., resolver) is arranged to detect an angle (θ) and speed (ω) associated with the rotor 112. A resolver offset operation 148 is applied to the raw position data detected by the resolver 146. As discussed in more detail below, the resolver offset operation 148 may be controlled to achieve a desired temperature associated with the electric machine 110.

A temperature sensor 154 is arranged, in this example, to sense a temperature (T) associated with windings of the stator 114. In other examples, the temperature sensor 154 may be arranged to sense a temperature associated with the rotor 112. Temperature data may also be acquired directly from the inverter 118 via a communication bus, estimated through indirect measurement, etc. A torque sensor 156 is arranged to sense a torque (Tq) output by the electric machine 110 via the rotor 112. This temperature and torque data, as discussed in more detail below, may be used to control the electric machine 110 to achieve a desired temperature.

An inverter controller 119 compares torque setpoint data with the torque data from the torque sensor 156 at difference block 160. A PID controller 162, for example, produces a torque setpoint command for the inverter 118 (lookup table 124) based on the error signal resulting from the difference block 160. This torque setpoint command will act to reduce error between the actual and desired torque at the rotor 112.

The inverter controller 119 further compares temperature setpoint data with the temperature data from the temperature sensor 154 at difference block 164. A PID controller 166, for example, produces a temperature correction factor (ε) that modifies the resolver offset operation 148. (Similar to FIG. 1, the resolver offset operation 148 in the absence of the temperature correction factor applies an offset (δ) to raw position data (θ) detected by the resolver 146.) This corrected angle data (θ+δ+ε) is provided to the Park transform 122.

The temperature correction factor influences the orientation of the three-phase AC current provided to the electric machine 110. That is, the PID controller 166 generates a temperature correction factor such that, if an increase in temperature associated with the electric machine 110 is desired, the measured Id will appear to be less than commanded and the measured Iq will appear to be more than commanded. As a result, signals provided to the difference block 152 will increase the Id error when compared with signals from the lookup table 124. The Id and Iq controllers 126 and inverse Park/3rd harmonic/space vector modulation controller 128 will thus cause the IGBT pack 130 to operate to increase Id and decrease Iq of the three-phase AC current supplied to the electric machine 110—resulting in the electric machine 110 loosing efficiency and decreasing the amount of torque being produced. This decrease in torque will in turn result in additional error being detected by the error block 160, which will result in an increased torque demand to the inverter 118 by the torque control block 162 and an increased current setpoint generated by the lookup table 124.

Figure 3:
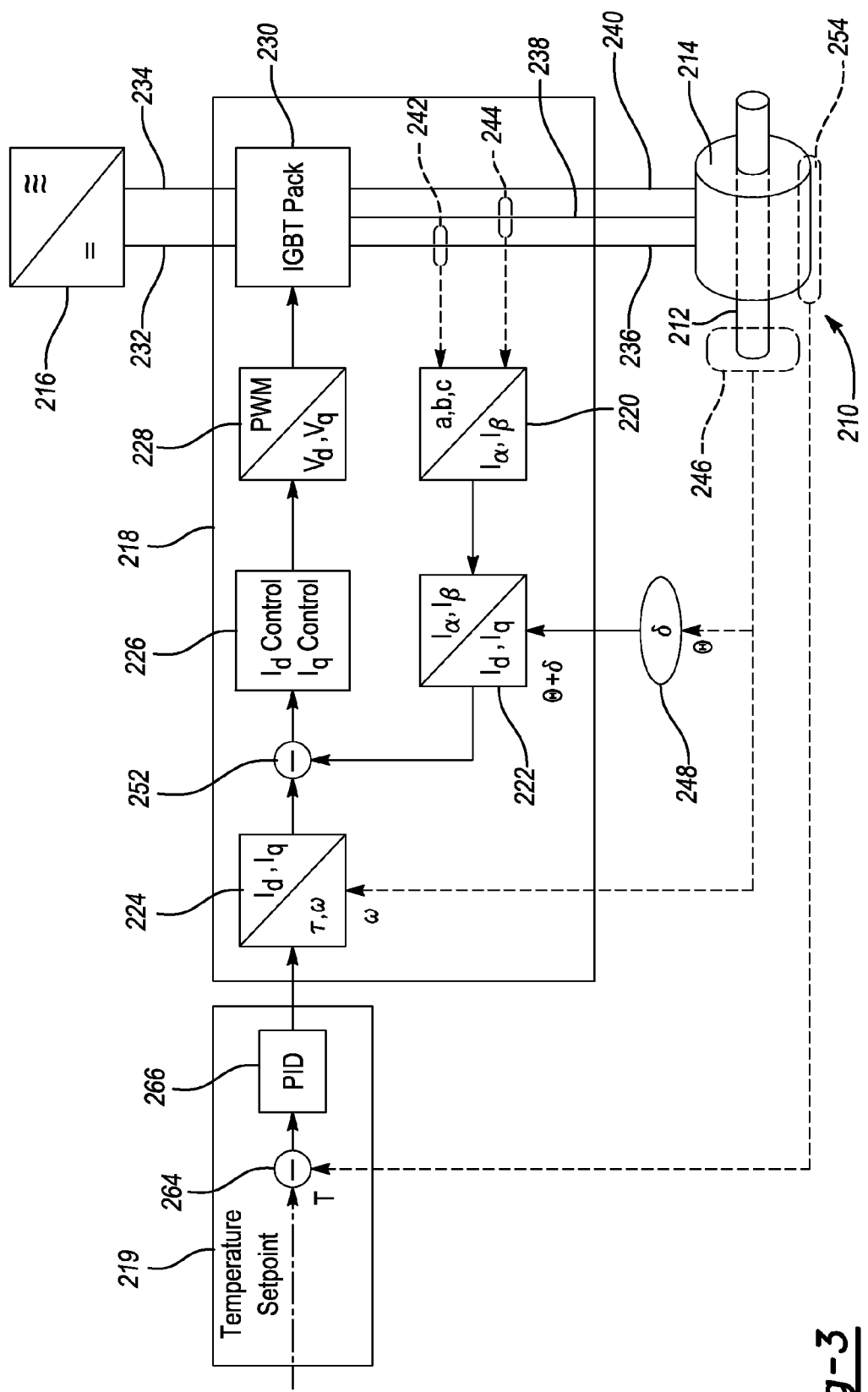

Referring to FIG. 3, elements that share similar numbering to that of FIGS. 1 and 2 have similar descriptions. An electric machine 210 includes a rotor 212 and stator 214 (with at least one winding). The electric machine 210 is arranged to receive power from a DC bus 216 via an inverter 218. The inverter 218 includes a Clarke transform 220, a Park transform 222, a lookup table 224, Id and Iq controllers 226, an inverse Park/3rd harmonic/space vector modulation controller 228, and an insulated-gate bipolar transistor (IGBT) pack 230. (As mentioned earlier, other inverter arrangements are also possible.)

DC current from the DC bus 216 is supplied to the IGBT pack 230 via electrical lines 232, 234. Three-phase AC current from the IGBT pack 230 is supplied to the electric machine 210 via the electrical lines 236, 238, 240. Current sensors 242, 244 are arranged to sense current associated with the electric lines 236, 238 respectively.

An absolute position sensor 246 is arranged to detect an angle (θ) and speed (ω) associated with the rotor 212. An offset operation 248 (δ) is applied to the raw position data detected by the sensor 246. This corrected angle data (θ+δ) is provided to the Park transform 222.

A temperature sensor 254 is arranged, in this example, to sense a temperature (T) associated with windings of the stator 214. Temperature data, however, may be acquired in other ways as explained earlier. This temperature data may be used to control the electric machine 210 to achieve a desired temperature.

An inverter controller 219 compares temperature setpoint data with the temperature data from the temperature sensor 254 at difference block 264. A PID controller 266, for example, produces a torque setpoint command for the inverter 218 (lookup table 224) based on the error signal resulting from the difference block 264. This torque setpoint command will act to reduce error between the actual and desired temperature at the stator 214.

Referring to FIG. 4, elements that share similar numbering to that of FIG. 3 have similar descriptions. An inverter controller 319 compares temperature setpoint data with temperature data from an electric machine at difference block 364. A PID controller 366, for example, produces a power signal based on the error signal resulting from the difference block 364. This power signal is then divided at quotient block 368 by speed associated with a rotor of the electric machine to yield a torque setpoint for an inverter. Other control schemes are also contemplated.

Calibration and Performance Testing

Electric machine parameters such as inductance (Ld, Lq) and optimum current setpoint (Id, Iq) may be characterized for each operating condition through calibration and performance testing. Referring to FIG. 5, an example motor calibration and performance test procedure cycles between temperature control and torque control such that measurements are taken over a range of operating conditions for a given speed setpoint, temperature setpoint and other variables.

At time t0 and for a speed setpoint of 1000 revolutions per minute (rpm) (maintained by a dynamometer for example), a calibration and performance test system enters temperature control mode so that an electric machine achieves a desired temperature: an inverter is controlled in a manner similar, for example, to that described with reference to FIG. 4 so that the electric machine achieves an 80° C. setpoint. At time t1 and for the speed setpoint of 1000 rpm, the test system enters torque control mode: the inverter is controlled in a manner similar, for example, to that described with reference to FIG. 1 so that the electric machine is commanded to output 100 newton meters (Nm) of torque. Parameter measurements are then taken. (Input parameters may vary during temperature control mode, which may interfere with parameter measurement.) At time t2 and for the speed setpoint of 1000 rpm, the test system enters temperature control mode: the inverter is again controlled so that the electric machine achieves the 80° C. setpoint. At time t3 and for the speed setpoint of 1000 rpm, the test system enters torque control mode: the inverter is controlled so that the electric machine is commanded to output 110 Nm of torque. Parameter measurements are then taken. This scheme is repeated for a range of speed, temperature and torque setpoints as listed. Since the torque setpoint is sent directly to the inverter, any other inverter setpoint type and command mode (e.g., torque as a percentage of maximum load, current control, terminal voltage control, etc.) can be substituted for the torque control mode.

The maximum time values t0, t1, t2, t3, etc. are programmed before the start of the test profile. To minimize total test time, the dwell periods (t1-t0, t2-t1, t3-t2, etc.) can be reduced using a stability check, such as if the variance of the feedback signal has reached a minimum threshold.

Figure 6:
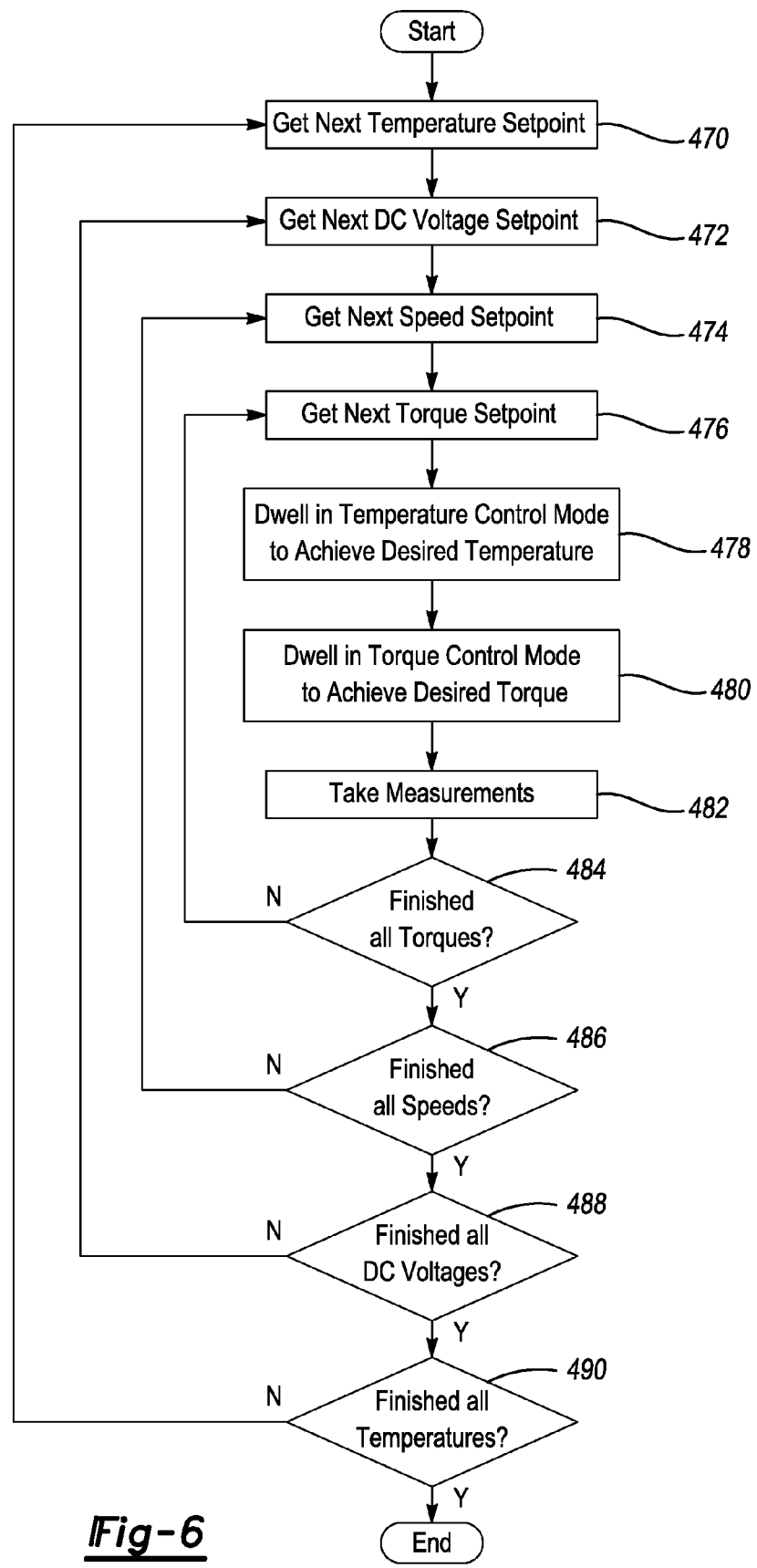
FIG. 6 is a flow chart of an algorithm for motor calibration and performance testing.

Referring to FIG. 6, a calibration and performance test system acquires a next temperature setpoint at operation 470, a next DC voltage setpoint at operation 472, a next speed setpoint at operation 474, and a next torque setpoint at operation 476. At operation 478, the test system dwells in temperature control mode until the electric machine under test stabilizes at the desired temperature. At operation 480, the test system dwells in torque control mode until the electric machine under test stabilizes at the desired torque or load level. At operation 482, the test system then takes electric machine parameter measurements. At operation 484, the test system determines whether all torque setpoints have been tested. If no, the algorithm returns to operation 476. If yes, the test system determines whether all speed setpoints have been tested at operation 486. If no, the algorithm returns to operation 474. If yes, the test system determines whether all DC voltage setpoints have been tested at operation 488. If no, the algorithm returns to operation 472. If yes, the test system determines whether all temperature setpoints have been tested at operation 490. If no, the algorithm returns to operation 470. If yes, the algorithm ends.

Transitioning from one operating mode to another can often result in sharp changes to the process control signal—resulting in system disturbance, which increases testing time (due to increases in settling time) and decreases accuracy and repeatability of results. Standard bumpless mode transfer control techniques can therefore be used to minimize the impact of transitioning from one operating mode to another.

Durability Testing

The control modes described above may also be used for durability testing purposes. An electric machine, for example, can be cycled between temperature control modes having (i) an 80° C. temperature setpoint and 1000 rpm speed setpoint and (ii) a 120° C. temperature setpoint and 1500 rpm speed setpoint. Cycling between a low temperature, low speed operating point and a high temperature, high speed operating point can accelerate wear of the electric machine, resulting in improved repeatability and shorter durability testing times.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. Although PID control schemes as an example were discussed above, any suitable control scheme (e.g., proportional integral, etc.), may be used. The control techniques of FIG. 3, as another example, can be applied to any inverter architecture or motor type that accepts command setpoints proportional to load, etc. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A test automation system comprising:
at least one controller programmed to receive a temperature setpoint for a motor and to generate a command for the motor to output non-zero torque such that a temperature of the motor varies within a predefined range of the temperature setpoint for at least a predefined period of time.

2. The system of claim 1, wherein the at least one controller is further programmed to generate an offset derived from the temperature of the motor such that the motor alters a shaft angular absolute position measurement of a rotor of the motor to influence an orientation of three-phase AC current provided to the motor to control the temperature of the motor.

3. The system of claim 2, wherein the temperature of the motor is a temperature of a winding of the motor.

4. The system of claim 2, wherein the temperature of the motor is a temperature of a rotor of the motor.

5. The system of claim 1, wherein the command is based on a temperature of a winding of the motor.

6. The system of claim 1, wherein the command is based on a temperature of a rotor of the motor.

7. The system of claim 1, wherein the at least one controller is further programmed to, in response to the motor varying within the predefined range of the temperature setpoint for at least the predefined period of time, specify a control setpoint for the motor and generate another command for the motor to output another non-zero torque such that the motor stabilizes at the control setpoint, and in response to the motor stabilizing at the control setpoint, measure operating parameters of the motor.

8. A method for controlling a motor, the method comprising:
receiving a temperature setpoint for the motor; and
commanding the motor to output non-zero torque such that the motor achieves the temperature setpoint based on a temperature of the motor.

9. The method of claim 8 further comprising altering a shaft angular absolute position measurement of a rotor of the motor with an offset derived from the temperature of the motor to influence an orientation of three-phase AC current provided to the motor to control the temperature of the motor.

10. The method of claim 8 further comprising, in response to the motor achieving the temperature setpoint, specifying a torque setpoint for the motor and commanding the motor to output another non-zero torque such that the motor achieves the torque setpoint, and in response to achieving the torque setpoint, measuring operating parameters of the motor.

11. A test automation system comprising:
at least one controller programmed to receive a temperature setpoint for a motor and to control the motor to output non-zero torque based on a difference between the temperature setpoint and a temperature of the motor to stabilize the motor at the temperature setpoint.

12. The system of claim 11, wherein the at least one controller is further programmed to alter a shaft angular absolute position measurement of a rotor of the motor with an offset derived from the temperature of the motor to influence an orientation of three-phase AC current provided to the motor.

13. The system of claim 12, wherein the temperature of the motor is a temperature of a winding of the motor.

14. The system of claim 11, wherein the temperature of the motor is a temperature of a rotor of the motor.

15. The system of claim 11, wherein the at least one controller is further programmed to, in response to the motor stabilizing at the temperature setpoint, specify a torque setpoint for the motor and control the motor to stabilize the motor at the torque setpoint, and in response to the motor stabilizing at the torque setpoint, measure operating parameters of the motor.

* * * * *